(12) United States Patent
Klein

(10) Patent No.: US 6,282,640 B1
(45) Date of Patent: *Aug. 28, 2001

(54) METHOD FOR IMPROVED STORAGE OF COMPUTER SYSTEM CONFIGURATION INFORMATION

(75) Inventor: Dean A. Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/960,716

(22) Filed: Oct. 30, 1997

Related U.S. Application Data

(63) Continuation of application No. 08/735,729, filed on Oct. 23, 1996, now Pat. No. 5,938,764.

(51) Int. Cl.$^7$ ........................................................ G06F 9/06
(52) U.S. Cl. ................................... 713/1; 713/2; 710/104
(58) Field of Search ................................. 713/1, 2, 100; 710/104; 711/102, 103, 104, 105

(56) References Cited

U.S. PATENT DOCUMENTS

| | | | |
|---|---|---|---|
| 5,269,022 | 12/1993 | Shinjo et al. | 395/700 |
| 5,307,497 | 4/1994 | Feigenbaum et al. | 395/700 |
| 5,327,531 | 7/1994 | Bealkowski et al. | 395/164 |
| 5,371,876 | * 12/1994 | Ewertz et al. | 711/159 |
| 5,388,267 | 2/1995 | Chan et al. | 395/700 |
| 5,410,699 | * 4/1995 | Bealkowski et al. | 713/2 |
| 5,657,448 | 8/1997 | Wadsworth et al. | 395/200.5 |
| 5,664,194 | 9/1997 | Paulsen | 395/712 |
| 5,822,581 | * 10/1998 | Christeson | 713/1 |

OTHER PUBLICATIONS

Compaq Computer Corporation; Phoenix Technologies Ltd.; and Intel Corporation "Plug and Play BIOS Specification, Version 1.0A" 56pp., May 5, 1994.

Intel Corporation; Microsoft Corporation "Plug and Play ISA Specification, Version 1.0a" 66pp., May 5, 1994.

Shanley, Tom/Anderson, Don, Chap. VII, "The Power–Up Sequence," pp. 113–117; Chap. XV, "ROM Memory," pp. 315–332; Chap. XXI, "RTC and Configuration RAM," pp. 441–447, *Isa System Architecture*, 3$^{rd}$ Edition, Addison–Wesley Publishing Co., U.S., 1995.

* cited by examiner

Primary Examiner—Thomas Lee
Assistant Examiner—Thuan Du
(74) *Attorney, Agent, or Firm*—Dorsey & Whitney LLP

(57) ABSTRACT

A computer system and method is described for improved storage of computer system configuration information. A ROM module includes both a BIOS ROM portion and a configuration ROM portion. The configuration ROM includes a backup copy of the system configuration parameters stored in a battery-powered configuration CMOS RAM. If the configuration CMOS RAM fails to provide valid configuration data, the contents of the configuration ROM are used to configure the computer system. If the contents of the configuration ROM are also invalid, default configuration values are provided by the BIOS ROM. User modification of the default values may be effected through a setup utility program, and the configuration ROM then programmed accordingly.

10 Claims, 3 Drawing Sheets

METHOD FOR IMPROVED STORAGE OF COMPUTER SYSTEM CONFIGURATION INFORMATION

CROSS-REFERENCE TO RELATED APPLICATION

This application is a continuation of U.S. patent application Ser. No. 08/735,729, filed Oct. 23, 1996, now U.S. Pat. No. 5,938,764.

TECHNICAL FIELD

This invention relates generally to operating computer systems, and more particularly, to storage of system configuration information used in computer systems.

BACKGROUND OF THE INVENTION

The use of computers, especially personal computers (PCs), is widespread. The computing power of the PC, whether coupled to a network or operating as a stand-alone device, has increased significantly as new computer designs move into production. Central processing units have become faster and more complex with each new generation of PC. Memory chips have increased in both capacity and speed. A wide variety of input/output (I/O) devices with various performance capabilities may be included in a PC. Examples of I/O devices include keyboards, pointing devices, scanners, disk drives, CD-ROM drives, printers, display monitors, local area network (LAN) adapters, FAX/modem boards, sound boards, etc. I/O devices are produced by many different manufacturers and come in various models with varying operational characteristics. The number of distinct combinations of components in a PC is very large.

In order for the components of a PC to function together properly and optimally, computer system configuration information is provided to a microprocessor during the power-on self-test (POST) and system initialization routines executed when a PC is first powered-up or reset. The system configuration information is used by the microprocessor to initialize the various components of the PC. Device registers are set, device parameters are loaded, interrupt vectors are created, etc. Computer operating system and/or other system management software is then configured in accordance with the system configuration information.

Because of the wide variety of system components available in today's PCs, a battery-powered complementary metal oxide semiconductor (CMOS) random access memory (RAM) is included to retain the computer system configuration information when the PC is powered-down. Typically, the CMOS RAM is part of the computer system's real-time clock and calendar chip. In the event the system configuration information stored in the CMOS RAM is lost, certain configuration default values are provided by the read-only memory (ROM) basic input/output service (BIOS) chip. However, unlike configuration information stored in the CMOS RAM, these default values are not customized to the particular configuration of the PC. The PC then functions poorly, and a user must reprogram the configuration CMOS RAM. Properly reprogramming the CMOS RAM with the lost system configuration parameters can be difficult, especially for individuals with little or no technical background.

Manufacturers have attempted to overcome the problems associated with lost computer system configuration information by providing highly reliable batteries to power the volatile CMOS RAM. Additionally, certain components, such as peripheral add-ins with plug-and-play capability, include a non-volatile ROM memory for storing that particular component's configuration parameters. However, it can be appreciated that there is a significant need for an improved method and apparatus for storage of computer system configuration information.

SUMMARY OF THE INVENTION

The present invention is embodied in a method and apparatus for improved storage of computer system configuration information. A computer system includes a ROM module having a BIOS ROM portion and a configuration ROM portion. The system also includes a battery-powered configuration CMOS RAM for storing system configuration parameters required to initialize various computer system components. The configuration ROM includes a backup copy of the system configuration parameters. If the configuration CMOS RAM fails to provide valid configuration data, the contents of the configuration ROM are then used to configure and initialize the computer system. Basic system default configuration values are provided by the BIOS ROM only in the event the contents of the configuration ROM are also invalid. A user may then modify the system configuration default values and reprogram the configuration ROM accordingly.

In one embodiment, a computer system includes a first non-volatile memory for storing system start-up routines executable by a microprocessor. A second non-volatile memory stores system configuration parameters, each corresponding with one of a plurality of selected system components. The first and second non-volatile memories may be first and second reserved portions of a single non-volatile memory. The microprocessor executes the system start-up routines to initialize each of the system components according to the system configuration parameters.

In a second embodiment, a computer system includes a microprocessor, a plurality of I/O devices coupled with the microprocessor, and a configuration data storage system. The configuration data storage system includes a volatile memory for storing a plurality of custom configuration data, which the microprocessor uses to initialize each of the I/O devices. The configuration data storage system also includes first and second non-volatile memories. The first non-volatile memory stores a back-up copy of the custom configuration data, and the microprocessor copies this back-up copy into the volatile memory in the event the data stored in the volatile memory is corrupted. The second non-volatile memory stores default configuration data, and the microprocessor initializes each of the I/O devices according to the default configuration data in the event that both the data stored in the volatile memory and in the first non-volatile memory are corrupted.

A method of operating a computer system includes programming a first non-volatile memory with a set of system initialization routines executable by a microprocessor. The first non-volatile memory is also programmed with a set of basic system configuration default parameters. A second non-volatile memory is programmed with a plurality of customized computer configuration parameters corresponding with selected computer system components. The customized computer configuration parameters are tested for errors. If an error is indicated, the system initialization routines are executed to initialize each of the selected computer system components in accordance with the default parameters. If, however, no error is indicated, the system initialization routines are executed to initialize each of the computer system components in accordance with the customized computer configuration parameters.

A method is provided for configuring a computer system which includes a processor coupled with a non-volatile memory, a volatile memory, and a plurality of I/O devices. Both default system configuration data and customized system configuration data are stored in the non-volatile memory. The customized system configuration data is also stored in the volatile memory. A first validity status is checked for the customized system configuration data stored in the volatile memory. If this first status is valid, each of the I/O devices is initialized in accordance with the data stored in the volatile memory. If the first status is invalid, a second validity status is checked for the customized system configuration data stored in the non-volatile memory. If this second status is valid, the customized system configuration data stored in the non-volatile memory is copied into the volatile memory.

DETAILED DESCRIPTION OF THE INVENTION

Embodiments of a novel computer system and a method are described for improved storage of computer system configuration information. In the following description, specific details are set forth in order to provide a sufficient understanding of the present invention. It will be clear, however, to one skilled in the art that the present invention may be practiced without these details. In other instances, well-known circuits, control signals and software operations have not been shown in detail in order not to unnecessarily obscure the invention.

Figure 1:
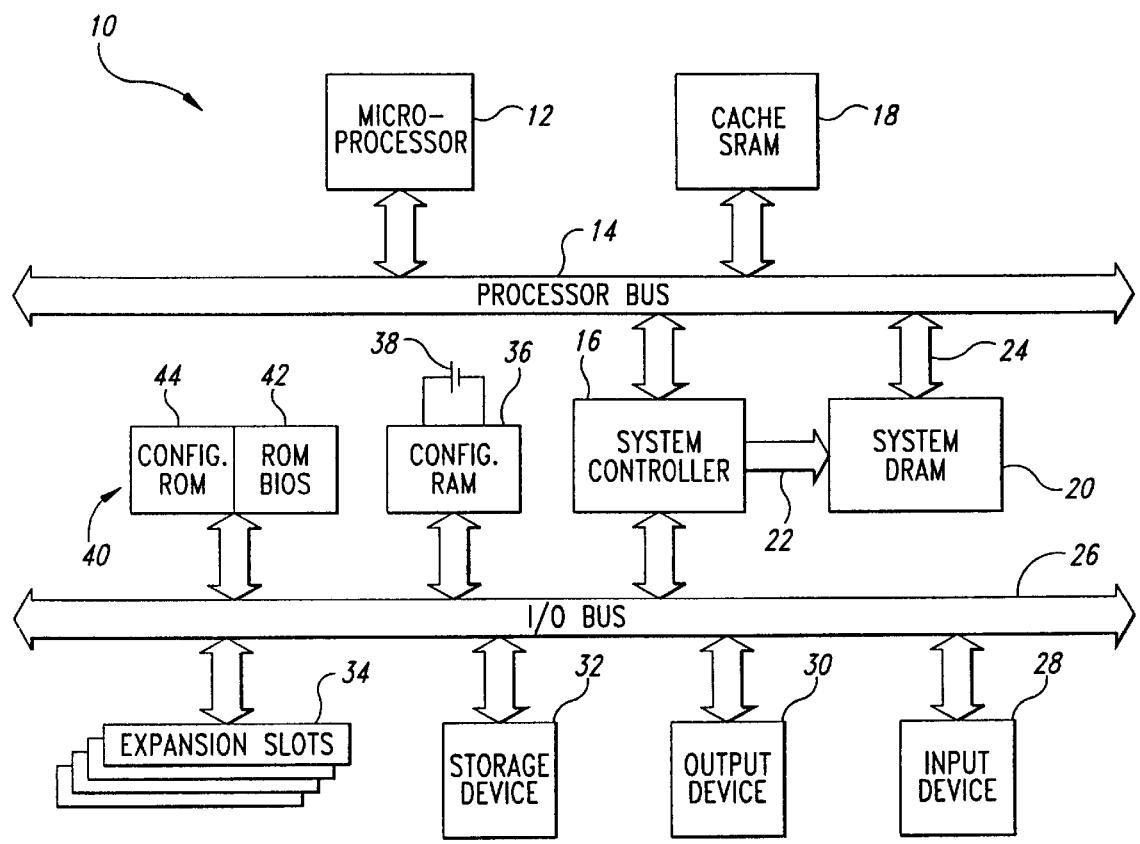
FIG. 1 is a functional block diagram of a preferred embodiment of a computer system having a configuration ROM according to the present invention.

FIG. 1 shows a computer system 10, such as an IBM-compatible PC, according to the present invention. A microprocessor 12, such as the Pentium™ processor, is connected to a processor bus 14 which carries address, data and control signals. The processor bus 14 is in turn connected to a system controller 16 and a cache memory 18, such as a static random access memory (SRAM) array. The system controller 16 acts as a memory controller accessing a main memory, such as a system dynamic random access memory (DRAM) 20, via a memory address and control bus 22. A data portion of the processor bus 14 is coupled with the system DRAM 20 by a memory data bus 24. The system DRAM 20 can include any of various known memory devices, such as DRAM devices manufactured by Micron Technology, Inc.

The system controller 16 also serves as a bridge circuit between the processor bus 14 and a system bus, such as I/O bus 26. The I/O bus 26 may itself be a combination of one or more bus systems with associated interface circuitry (e.g., PCI bus with connected SCSI and ISA bus systems). Connected to the I/O bus 26 are multiple I/O devices 28–32. One or more data input devices 28, such as a keyboard, mouse, etc., are coupled to the I/O bus 26. Also, one or more data output devices 30, such as visual display devices, printers, etc., are coupled to the I/O bus 26. Additionally, one or more data storage devices 32, such as disk drives, tape drives, CD-ROM drives, etc., are coupled to the I/O bus 26. Also coupled to the I/O bus 26 are expansion slots 34 to provide future accommodation of other I/O devices not selected during the original design of the computer system.

As in prior art computer systems, the computer system 10 includes a volatile configuration CMOS RAM 36 which is powered by a battery 38. The configuration CMOS RAM 36 is programmed in a conventional manner to store those computer system configuration parameters customized to the particular components employed in the computer system 10. These customized system configuration parameters are required to initialize the computer system 10 for proper and optimal operation. Unlike prior art PCs, the computer system 10 includes a non-volatile ROM module 40 having a BIOS ROM portion 42 and a configuration ROM portion 44. The ROM module 40 is preferably a flash electrically erasable programmable read-only memory (flash EEPROM). The BIOS ROM portion 42 and the configuration ROM portion 44 are preferably included in a single ROM chip; however, separate BIOS ROM and configuration ROM chips are acceptable.

The BIOS ROM 42 is programmed in a conventional manner to include various well-known instruction sets controlling the operation of the microprocessor 12. Included are system start-up routines, such as POST, system configuration initialization, and disk boot (in which a computer operating system program is located and instructions therefrom executed by the microprocessor 12). The BIOS ROM 42 also includes hardware interrupt handling and program service request handling routines. The program service request handling routines attend to the details of interacting with I/O devices and service those requests initiated by software programs to, for example, read information from a hard drive, clear a display screen, or write information to a printer. The hardware interrupt handling routines handle requests initiated by hardware components of the computer system, such as when a key is pressed on a keyboard.

Under control of the system initialization routines provided by the BIOS ROM 42, the microprocessor 12 initializes various system components by checking for system configuration information stored in the battery-powered configuration CMOS RAM 36 and by electronically interrogating certain of the system components and checking for a response. Also stored in the BIOS ROM 42 is a novel start-up routine which the processor executes in the event the configuration CMOS RAM 36 has failed to properly store the system configuration parameters. This new start-up routine is described in detail below in connection with FIGS. 2A and 2B.

The configuration ROM 44 is programmed to store a copy of the system configuration parameters contained in the configuration CMOS RAM 36. In the event the configuration CMOS RAM 36 fails, the necessary system configuration information may be retrieved from the configuration ROM 44. A system management utility program then allows copying the contents of the configuration ROM 44 to the configuration CMOS RAM 36, once the conditions causing the failure of the configuration CMOS RAM have been corrected. System management utility programs for reading data in one location and writing that data to another location in a computer system are well known to those skilled in the art and need not be described in detail. Even if the failure of the configuration CMOS RAM 36 has not been corrected, system configuration parameters can be obtained directly from the configuration ROM 44 by rerouting data access operations from the configuration CMOS RAM to the configuration ROM. Such data access operation rerouting can be accomplished by well-known means and need not be described in detail. In effect, the prior art provision of certain basic system configuration default values has been replaced by a back-up copy of the customized system configuration values.

For purposes of compatibility with present day computer systems, the battery-powered configuration CMOS RAM 36 is included in the preferred embodiment of the present invention. However, those skilled in the art will appreciate that the configuration CMOS RAM 36 may be eliminated and replaced entirely by the configuration ROM 44. Maintaining real-time clock and calendar functionality is then provided either by continued use of a battery or by relying on the presence of AC power to maintain the clock under normal circumstances. A capacitor could power the real-time clock during those most typical power outages that are of short duration. Alternatively, real-time clock and calendar functions can be provided by computer network servers and need not be included in individual PCs.

Figure 2A:
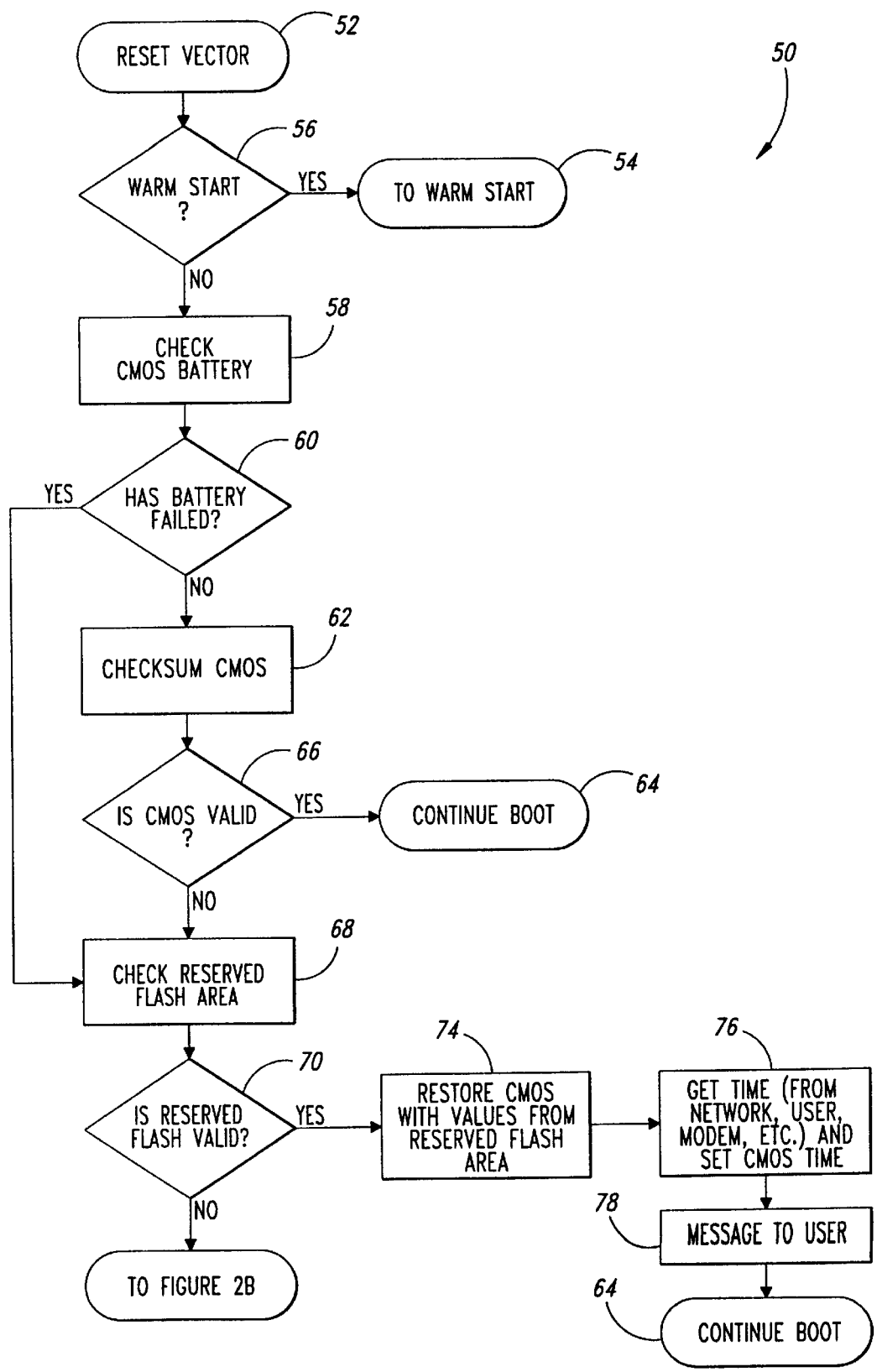
FIGS. 2A and 2B are flowcharts depicting a method of operating the computer system of FIG. 1.
Figure 2B:
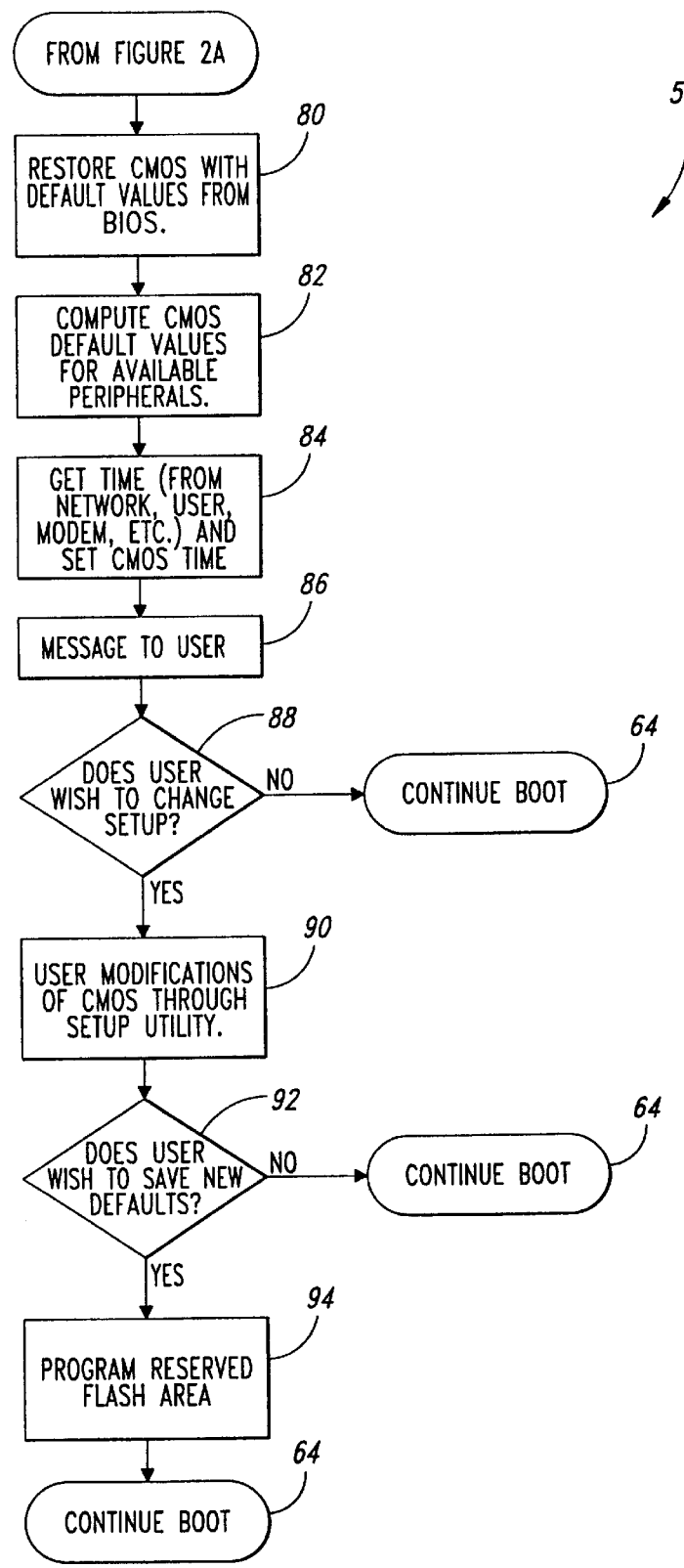

FIGS. 2A and 2B depict a computer system start-up software routine 50 executed by the microprocessor 12 and stored in the BIOS ROM 42 of the computer system 10 shown in FIG. 1. Upon receipt of a reset vector in a step 52, the microprocessor 12 begins execution of the start-up routine 50. In the event the reset vector is associated with a warm start (in which case POST and system initialization routines are skipped), the microprocessor 12 is routed to a conventional set of warm start instructions 54 via a conditional branch step 56. If a warm start is not indicated, a CMOS RAM status bit is checked in a step 58. The CMOS RAM status bit is well known to those skilled in the art, and when set to zero indicates that the battery has failed or been disconnected. A conditional branch step 60 then routes the program sequence dependent upon the results of the step 58. In the event the battery has not failed, the data validity of the configuration CMOS RAM 36 is tested in a step 62, typically by performing a checksum operation. If the CMOS RAM contents are valid, the microprocessor 12 is directed to a sequence of conventional operations 64 by a conditional branch step 66. The sequence of operations 64 continues system boot in a conventional manner.

If either the battery has failed or the results of the checksum operation indicate invalid data, the microprocessor 12 then executes a step 68 in which the data content of the configuration ROM 44 is tested. Preferably, this test would also employ a checksum operation, as in the step 62, although any of a variety of well-known error testing operations is acceptable. If the contents of the configuration ROM 44 are valid, a conditional branch step 70 directs the microprocessor 12 to a step 74 in which the contents of the configuration ROM 44 are written to the configuration CMOS RAM 36. Time and date information must then be obtained from a user, a network, modem, etc., in a step 76. A status message may be displayed to the user in a step 78, and the sequence of operations 64 associated with continued system boot is then executed in a conventional manner.

If, however, the contents of the configuration ROM 44 are not valid, the conditional branch in the step 70 directs the microprocessor 12 to a sequence of operations depicted in FIG. 2B. As in prior art computer systems, the microprocessor 12 must then rely on basic system configuration default values stored in the BIOS ROM 42, and the configuration CMOS RAM 36 is written with these default values in a step 80. If certain of the system components respond to auto-identification commands, additional configuration default values may be computed and stored in the configuration CMOS RAM 36 in a step 82. Time and calendar information is then obtained in a step 84 from the user, network, modem, etc., and a status message to the user may be displayed in a step 86.

The user may then choose to change certain of the default configuration values or to continue system boot with the BIOS default values via a conditional branch step 88. If the user wishes to continue system boot with the BIOS default values, the conditional branch step 88 directs the microprocessor 12 to the sequence of operations 64. If, however, the user wishes to modify certain of the default values prior to continued system boot, the user may effect such modification in a step 90 by using a conventional setup utility program. A conditional branch step 92 then allows the user to determine whether to program the configuration ROM 44 with the modified parameters contained in the configuration CMOS RAM 36. If so, the contents of the configuration CMOS RAM 36 are written to the configuration ROM 44 in a step 94, and the system boot is continued with the sequence of operations 64. If the user does not wish to program the configuration ROM 44, the conditional branch step 92 then directs the microprocessor 12 to the sequence of operations 64 continuing system boot.

As described above, the preferred embodiment of a computer system 10 according to the present invention includes a configuration CMOS RAM 36 for reasons of maintaining compatibility with present day computer systems and computer operating systems and/or other system management software routines. However, those skilled in the art will appreciate that the configuration CMOS RAM 36 can be eliminated and the computer system start-up routine 50 depicted in FIGS. 2A and 2B modified accordingly. In such a case, the steps 58–68 are eliminated and the conditional branch step 56 directs the microprocessor 12 to the step 70 if no warm start is indicated. Also, the steps 74–78 are eliminated and the conditional branch step 70 directs the microprocessor to the continued system boot operations 64 if the contents of the configuration ROM 44 are valid. The modification and saving of basic system configuration default values, shown in FIG. 2B, is also changed similarly.

Those skilled in the art will appreciate that many of the individual steps depicted in FIGS. 2A and 2B and described above are in fact each a sequence of operations which are well known in the art. One skilled in the art would be able to program such operations in the described sequence to practice the present invention. The various operations associated with each of the steps depicted in FIGS. 2A and 2B are not part of, nor critical to, the invention. Therefore, a detailed description of these operations is not required. Similarly, each of the circuits whose function and interconnection is described above in connection with FIG. 1 is of a type known in the art, and one skilled in the art would be able to use such circuits in the described combination to practice the present invention. The internal details of these particular circuits are not part of, nor critical to, the invention, and a detailed description of the internal circuit operation need not be provided.

It will be appreciated that, although an embodiment of the invention has been described above for purposes of illustration, numerous variations may be made without deviating from the spirit and scope of the invention. Those skilled in the art will appreciate that any number of well-known processor and bus types could be employed according to the present invention. Additionally, variations on the sequence of operations described in connection with FIGS. 2A and 2B is contemplated within the scope of the present invention. Accordingly, the invention is not limited except as by the appended claims.

What is claimed is:

1. A method of operating a computer system, comprising the steps of:

programming into a first non-volatile memory a set of system initialization routines;

programming into the first non-volatile memory a set of default computer configuration parameters;

programming into a second non-volatile memory a plurality of customized computer configuration parameters, each corresponding with one of a plurality of selected computer system components;

testing the customized computer configuration parameters for error;

if the testing indicates an error, executing the system initialization routines accessed from the first non-volatile memory to initialize each of the selected computer system components in accordance with the default computer configuration parameters accessed from the first non-volatile memory; and if the testing indicates no error, executing the system initialization routines to initialize each of the selected computer system components in accordance with the customized computer configuration parameters.

2. The method of claim 1 wherein the steps of programming into the first non-volatile memory each include the step of programming into a first reserved portion of a single non-volatile memory, and wherein the step of programming into the second non-volatile memory includes the step of programming into a second reserved portion of the single non-volatile memory.

3. The method of claim 1, further comprising the step of programming into a volatile memory the customized computer configuration parameters, and wherein the step of testing the customized computer configuration parameters for error includes the steps of:

testing a first validity status of the customized computer configuration parameters stored in the volatile memory; and if the first status is invalid, testing a second validity status of the customized computer configuration parameters stored in the second non-volatile memory.

4. The method of claim 1 wherein the step of testing the customized computer configuration parameters for error further includes the steps of:

if the second status is valid, copying the customized computer configuration parameters stored in the second non-volatile memory to the volatile memory for storage therein; and if the second status is invalid, copying the default computer configuration parameters to the volatile memory for storage therein.

5. The method of claim 3 wherein if the first status is valid, each of the selected computer system components is initialized in accordance with the customized computer configuration parameters stored in the volatile memory.

6. The method of claim 3 wherein if the second status is valid, each of the selected computer system components is initialized in accordance with the customized computer configuration parameters stored in the second non-volatile memory.

7. The method of claim 1 wherein the step of testing the customized computer configuration parameters for error includes the step of performing a checksum test of the customized computer configuration parameters.

8. A method of initializing a computer system having a processor coupled with a non-volatile memory and a volatile memory, the method comprising:

storing a plurality of customized configuration data in the volatile memory;

storing the plurality of customized configuration data in the non-volatile memory;

checking a first validity status of the customized configuration data stored in the volatile memory;

if the first status is valid, allowing the processor to access the customized configuration data stored in the volatile memory and initializing the computer system in accordance with the customized configuration data accessed from the volatile memory; and if the first status is invalid, allowing the processor to access the customized configuration data stored in the non-volatile memory to the processor and initializing the computer system in accordance with the customized system configuration data accessed from the non-volatile memory.

9. The method of claim 8 wherein the computer system further comprises a non-volatile memory storing default configuration data, the method further comprising:

if the first status is invalid, checking a second validity status of the customized configuration data stored in the non-volatile memory; and if the second status is invalid, allowing the processor to access the default configuration data stored in the non-volatile memory, and initializing the computer system in accordance with the default configuration data accessed from the non-volatile memory.

10. The method of claim 8, further comprising, if the first status is invalid, copying the customized configuration data stored in the non-volatile memory to the volatile memory.

* * * * *

UNITED STATES PATENT AND TRADEMARK OFFICE
CERTIFICATE OF CORRECTION

PATENT NO.     : 6,282,640 B1  
DATED          : August 28, 2001  
INVENTOR(S)    : Dean A. Klein It is certified that error appears in the above-identified patent and that said Letters Patent is hereby corrected as shown below:

<u>Column 7,</u>  
Line 35, "claim 1" should read -- claim 3 --

Signed and Sealed this

Eleventh Day of February, 2003

JAMES E. ROGAN  
*Director of the United States Patent and Trademark Office*